US010981726B2

(12) United States Patent
Hossler

(10) Patent No.: US 10,981,726 B2
(45) Date of Patent: Apr. 20, 2021

(54) TRUSS WITH POSITIONING SYSTEM

(71) Applicant: TIFFIN SCENIC STUDIOS, INC., Tiffin, OH (US)

(72) Inventor: Brad E. Hossler, Tiffin, OH (US)

(73) Assignee: TIFFIN SCENIC STUDIOS, INC., Tiffin, OH (US)

(*) Notice: Subject to any disclaimer, the term of this patent is extended or adjusted under 35 U.S.C. 154(b) by 241 days.

(21) Appl. No.: 16/208,100

(22) Filed: Dec. 3, 2018

(65) Prior Publication Data
US 2019/0186682 A1 Jun. 20, 2019

Related U.S. Application Data

(60) Provisional application No. 62/594,092, filed on Dec. 4, 2017.

(51) Int. Cl.
| B65G 9/00 | (2006.01) |
| F16M 11/42 | (2006.01) |
| F16M 11/18 | (2006.01) |
| E04C 3/08 | (2006.01) |
| B61B 3/00 | (2006.01) |
| E04C 3/04 | (2006.01) |

(52) U.S. Cl.
CPC ............... B65G 9/002 (2013.01); B61B 3/00 (2013.01); E04C 3/08 (2013.01); F16M 11/18 (2013.01); F16M 11/425 (2013.01); *E04C 2003/0495* (2013.01)

(58) Field of Classification Search
CPC .... E04C 2003/0486; E04C 3/08; E04C 5/065; E04C 3/04; E04B 1/19; E04B 1/2403; E04G 3/00; B21D 47/00; E04H 12/10; F16M 11/18; F16M 11/425; A63J 1/028; B66C 19/00; B65G 9/002; B61B 3/00
USPC ............................ 104/94; 105/155, 154, 156
See application file for complete search history.

(56) References Cited

U.S. PATENT DOCUMENTS

| 3,693,542 A | | 9/1972 | Moehlenpah | |
| 3,774,542 A | * | 11/1973 | Walsh | B61B 3/02 104/89 |
| 3,866,530 A | | 2/1975 | Moehlenpah | |
| 4,026,076 A | * | 5/1977 | Analetto | E04H 3/28 52/6 |
| 4,379,426 A | | 4/1983 | Thompson et al. | |
| 4,457,046 A | * | 7/1984 | Vater | E05D 15/063 105/155 |
| 4,520,732 A | * | 6/1985 | Schwarzkopf | A63G 7/00 104/245 |
| 4,862,336 A | * | 8/1989 | Richardson | H05B 47/155 362/285 |
| 5,278,742 A | | 1/1994 | Garrett | |
| 5,335,468 A | * | 8/1994 | Oberman | A63J 1/02 182/186.6 |

(Continued)

FOREIGN PATENT DOCUMENTS

EP        0508157        7/1995

*Primary Examiner* — Zachary L Kuhfuss
*Assistant Examiner* — Cheng Lin
(74) *Attorney, Agent, or Firm* — Barnes & Thornburg LLP; Alice O. Martin

(57) ABSTRACT

An appliance-support system in accordance with the present disclosure includes a truss and a positioning system coupled to the truss. The positioning system is adapted to support an appliance, such as a video display, light, speaker, or other device used during stage performances or events.

8 Claims, 5 Drawing Sheets

(56) References Cited

U.S. PATENT DOCUMENTS

| | | | |
|---|---|---|---|
| 5,412,552 A | 5/1995 | Fernandes | |
| 5,432,691 A * | 7/1995 | Garrett | F21V 17/00 |
| | | | 362/233 |
| 5,743,060 A | 4/1998 | Hayes et al. | |
| 6,209,171 B1 * | 4/2001 | Pelletier | E05D 15/063 |
| | | | 16/87 R |
| 6,341,564 B1 * | 1/2002 | Ochi | A63G 7/00 |
| | | | 104/48 |
| 6,408,587 B2 | 6/2002 | Cronin et al. | |
| 6,463,625 B2 * | 10/2002 | Mittag | E05D 15/0639 |
| | | | 16/105 |
| 6,465,736 B1 | 10/2002 | Spadaro | |
| 7,410,140 B2 | 8/2008 | Hartwick | |
| 8,046,872 B2 * | 11/2011 | Burgess, III | E05D 15/0639 |
| | | | 16/97 |
| 8,099,913 B1 | 1/2012 | Dodd | |
| 8,850,659 B2 * | 10/2014 | Ewing | E05D 15/0634 |
| | | | 16/91 |
| 8,950,716 B2 | 2/2015 | Kempf | |
| 10,155,527 B2 * | 12/2018 | Hossler | B62B 3/16 |
| 2013/0075993 A1 | 3/2013 | Christie et al. | |
| 2016/0264198 A1 * | 9/2016 | Laurenzo | F16B 43/00 |
| 2018/0022582 A1 * | 1/2018 | Passmann | E04B 1/24 |
| | | | 212/324 |
| 2018/0135316 A1 * | 5/2018 | Apostolopoulos | E01D 22/00 |

\* cited by examiner

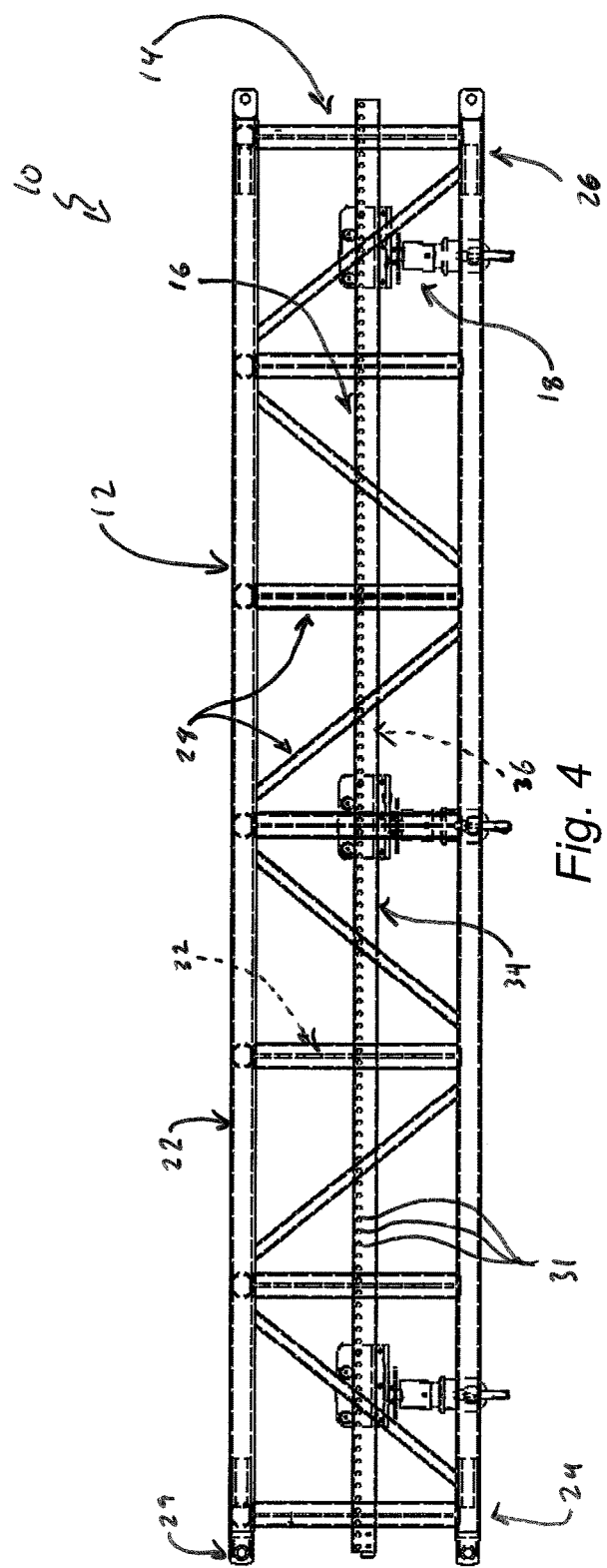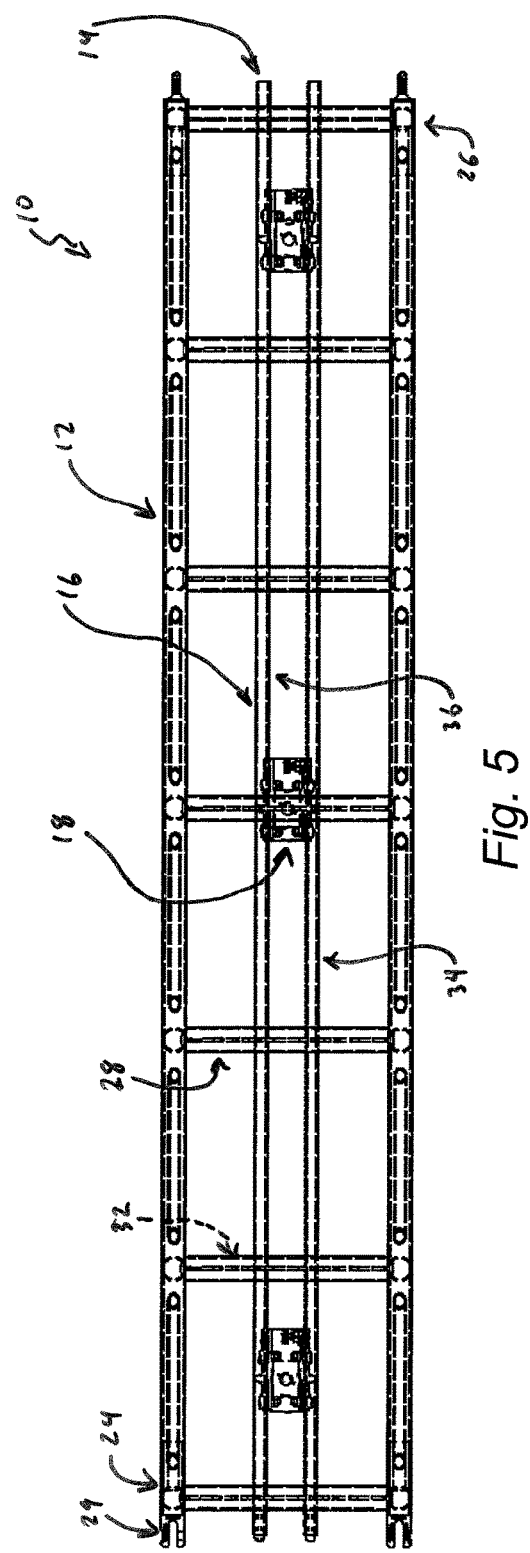

TRUSS WITH POSITIONING SYSTEM

PRIORITY CLAIM

This application claims priority under 35 U.S.C. § 119(e) to U.S. Provisional Application Ser. No. 62/594,092, filed Dec. 4, 2017, the disclosure of which is expressly incorporated by reference herein.

FIELD OF THE DISCLOSURE

The present disclosure relates generally to stage equipment, and more specifically to trusses used to support appliances, such as video displays.

BACKGROUND

Video displays and other equipment used for events, such as concerts, plays, or other gatherings, may be held on trusses. The trusses may be transported to an event location and secured together to form scaffolding for positioning the equipment relative to a stage, for example. The size and weight of the equipment attached to these trusses presents design challenges to their positioning and operation.

SUMMARY

The present application discloses one or more of the features recited in the appended claims and/or the following features which, alone or in any combination, may comprise patentable subject matter.

An appliance-support system in accordance with the present disclosure includes a truss and a positioning system coupled to the truss. The positioning system is adapted to support an appliance, such as a video display, light, speaker, or other device used during stage performances or events.

In illustrative embodiments, the positioning system includes a track extending along a length of the truss and a carriage coupled to the track. The carriage is movable along the track at the selection of a user. The carriage includes a body and a spindle coupled to the body. The body is engaged with the track to support the spindle and allow lateral adjustment relative to the truss along the track. The spindle allows adjustment of an attached appliance toward and away from the track.

These and other features of the present disclosure will become more apparent from the following description of the illustrative embodiments.

BRIEF DESCRIPTION OF THE DRAWINGS

FIG. 4 is a side elevation view of the appliance support system of FIG. 1 showing that the track includes a plurality of set-point holes and suggesting that the carriage can be locked in place relative to the track at the selection of a user by engaging the carriage with the set-point holes;

FIG. 5 is a top plan view of the appliance support system of FIG. 1;

DETAILED DESCRIPTION

Figure 1:
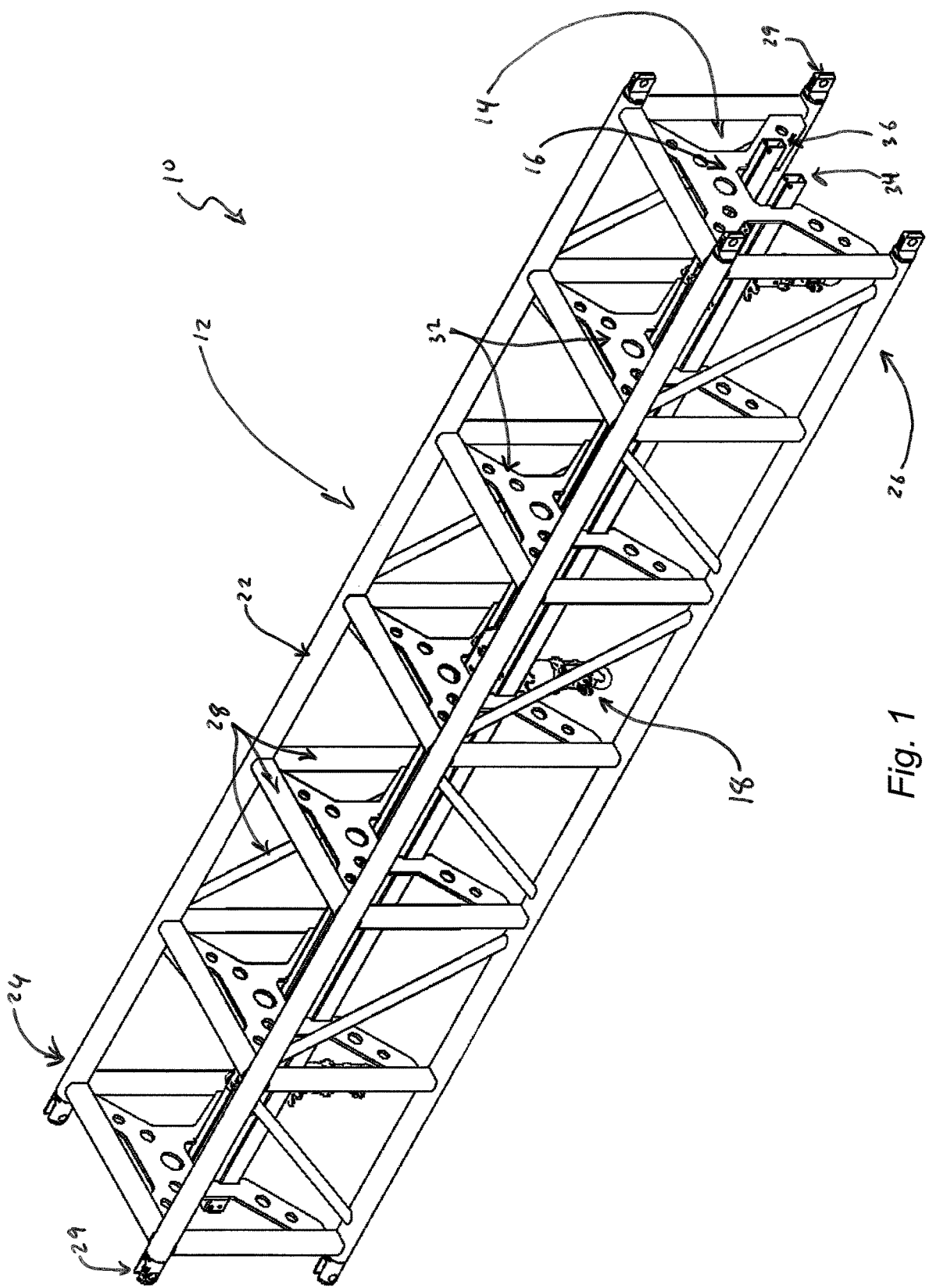
FIG. 1 is a perspective view of an embodiment of an appliance-support system in accordance with the present disclosure showing that the appliance-support system includes a truss and a positioning system coupled to the truss and configured to support an appliance.

For the purposes of promoting an understanding of the principles of the disclosure, reference will now be made to a number of illustrative embodiments illustrated in the drawings and specific language will be used to describe the same.

An illustrative appliance-support system 10 in accordance with the present disclosure is shown in FIG. 1. Appliance-support system 10 includes a truss 12 and a positioning system 14 coupled to truss 12. Truss 12 includes beams 22 extending between opposing ends 24, 26 of truss 12 and a plurality of cross bars 28 coupled to beams 22. Positioning system 14 includes a track 16 coupled to truss 12 by braces 32 and a carriage 18 coupled to track 16. Carriage 18 is configured to move along track 16 relative to truss 12 and to support appliances, such as a video display, light, speaker, or other device used during stage performances or events. In some embodiments, multiple carriages 18 are coupled to track 16 and work together to support an appliance. A plurality of couplers 29 are attached to truss 12 to allow connection with another truss to form a scaffolding to support appliances above an event stage, for example.

Figure 3:
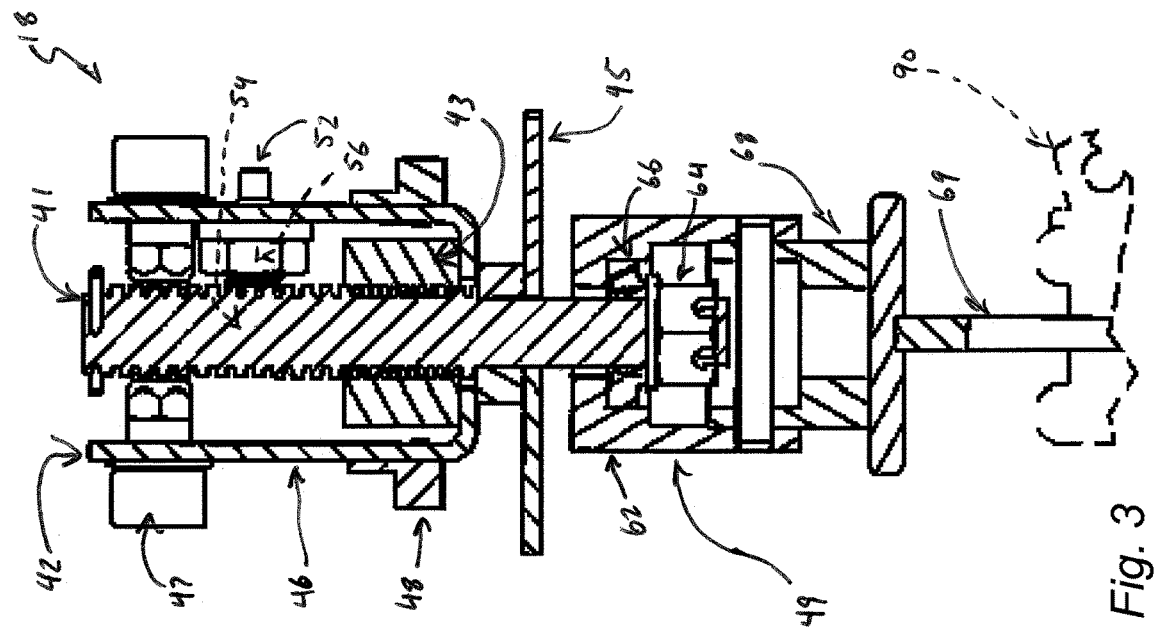
FIG. 3 is sectional view taken along line 3-3 in FIG. 2 showing that the spindle includes an adjustment bolt coupled to a threaded block, a hanger coupled to the adjustment bolt, and an adjustment knob and suggesting that the adjustment bolt can be rotated by the adjustment knob to move the hanger relative to the body.
Figure 2:
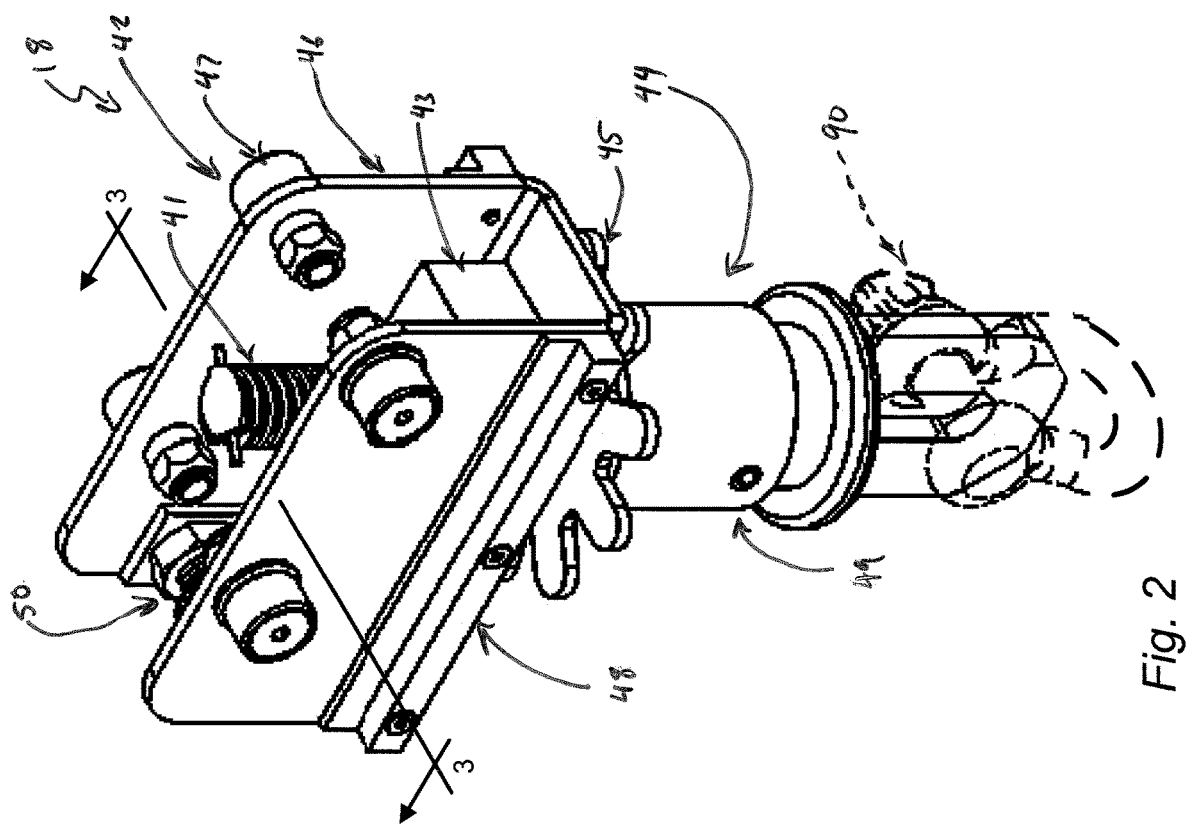
FIG. 2 is a perspective view of one embodiment of a carriage of the positioning system in accordance with the present disclosure showing that the carriage includes a body and a spindle coupled to the body.

One illustrative embodiment of a carriage 18 in accordance with the present disclosure is shown in FIGS. 2 and 3. Carriage 18 includes a body 42 and a spindle 44 coupled to body 42. Body 42 includes a U-shaped frame 46, a plurality of rollers 47 coupled to an upper portion of frame 46, and guides 48 coupled to a lower portion of frame 46. Rollers 47 are configured to rotate relative to frame 46. A twist lock 50 is coupled to body 42 and includes a lock pin 52 and a grip 54 coupled to lock pin 52 by a threaded section 56. Threaded section 56 allows a user to move lock pin 52 relative to body 42 using grip 54. In some embodiments, twist lock 50 is spring loaded to extend lock pin 52 outward from body 42 automatically.

Spindle 44 includes an adjustment bolt 41 coupled to a block 43 inside body 42, and a hanger 49 coupled to adjustment bolt 41 outside body 42 as shown in FIGS. 2 and 3. In the illustrative embodiment, adjustment bolt 41 and block 43 are coupled together by corresponding threads. An adjustment knob 45 is coupled to adjustment bolt 41 to allow a user to rotate adjustment bolt 41 for movement of hanger towards and away from body 42. In some embodiments, a spring loaded latch is coupled to body 42 and configured to fit between fingers of adjustment knob 45 to block rotation of adjustment knob 45 at the selection of a user.

Hanger 49 is configured to support a shackle 90 (shown in phantom) used to attach an appliance to carriage 18 as suggested in FIGS. 2 and 3. Hanger 49 includes a socket 62, a bearing 66, a cap 68, and a support flange 69 as shown in FIG. 3. Adjustment bolt 41 extends into socket 62 and bearing 66 is positioned between socket 62 and a nut 64 attached to adjustment bolt 41. Bearing 66 allows hanger 49 to rotate relative to adjustment bolt 41. In some embodiments, bearing 66 is a conical roller bearing. Cap 68 is coupled to socket 62 and support flange 69 is coupled to cap 68. Shackle 90 engages with support flange 69 to support an appliance on carriage 18.

Figure 6:
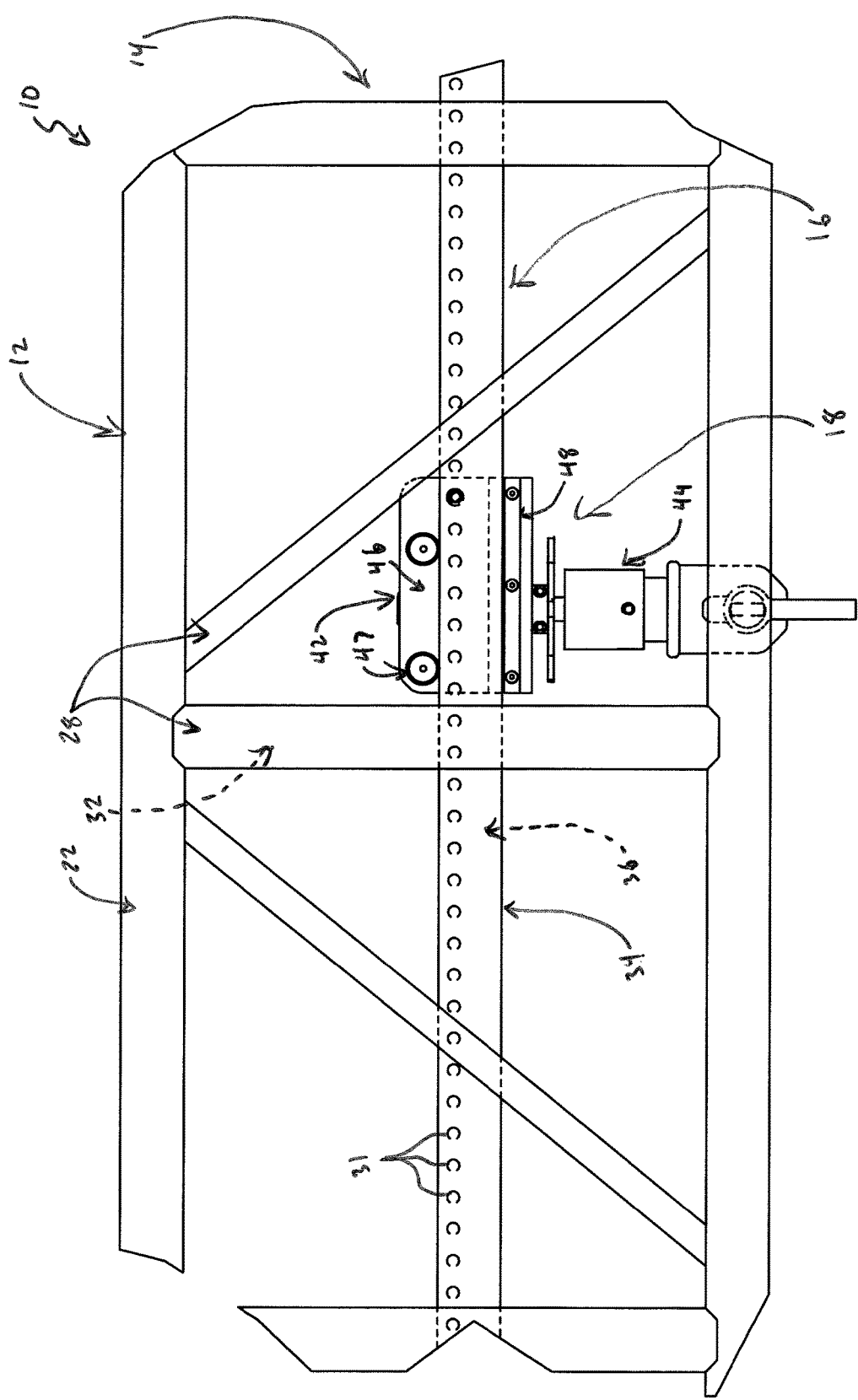
FIG. 6 is an enlarged view of FIG. 4 showing that rollers engage with an upper portion of the track to support the carriage for rolling movement on the track and that guides extend along a lower portion of the track to block vertical movement of the body relative to the track.
Figure 8:
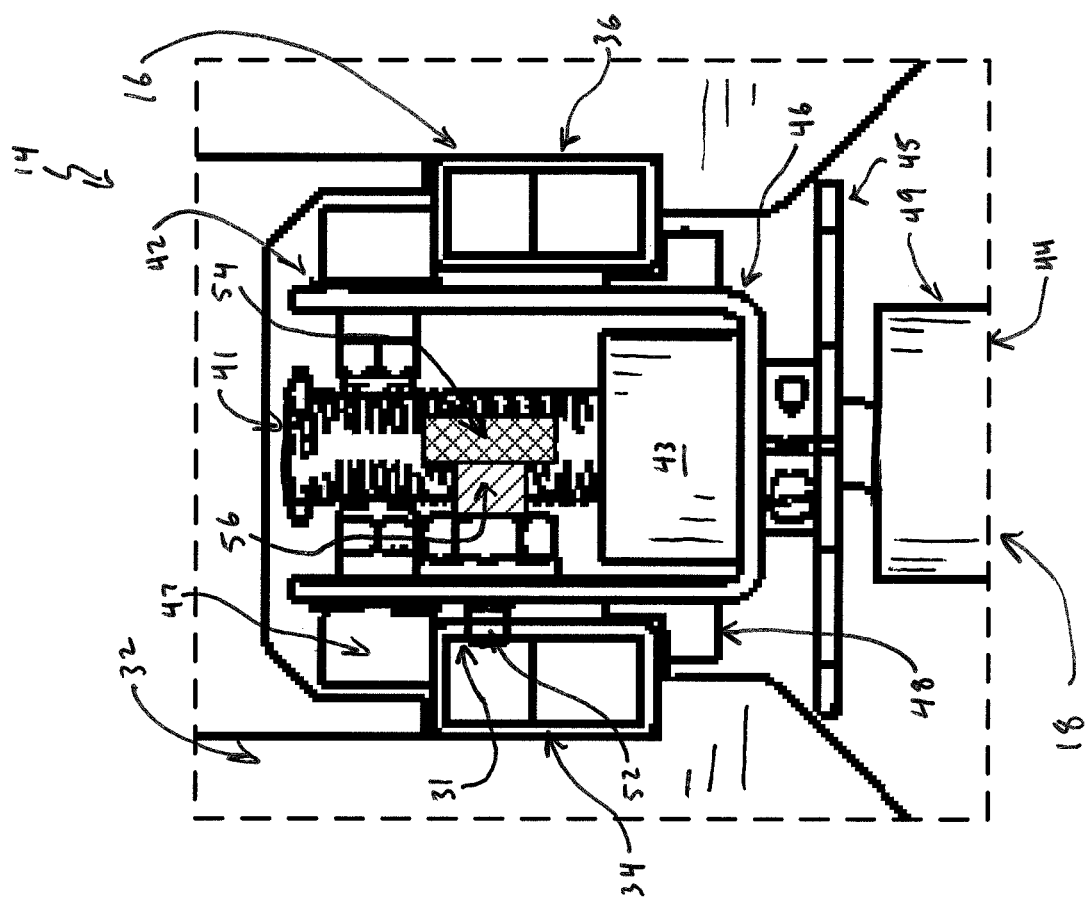
FIG. 8 is an enlarged view of FIG. 7 showing that a twist lock of the carriage includes a grip and a lock pin coupled to the grip and suggesting that the lock pin engages with the set-point holes of the track to block movement of the carriage relative to the track at the selection of a user.
Figure 7:
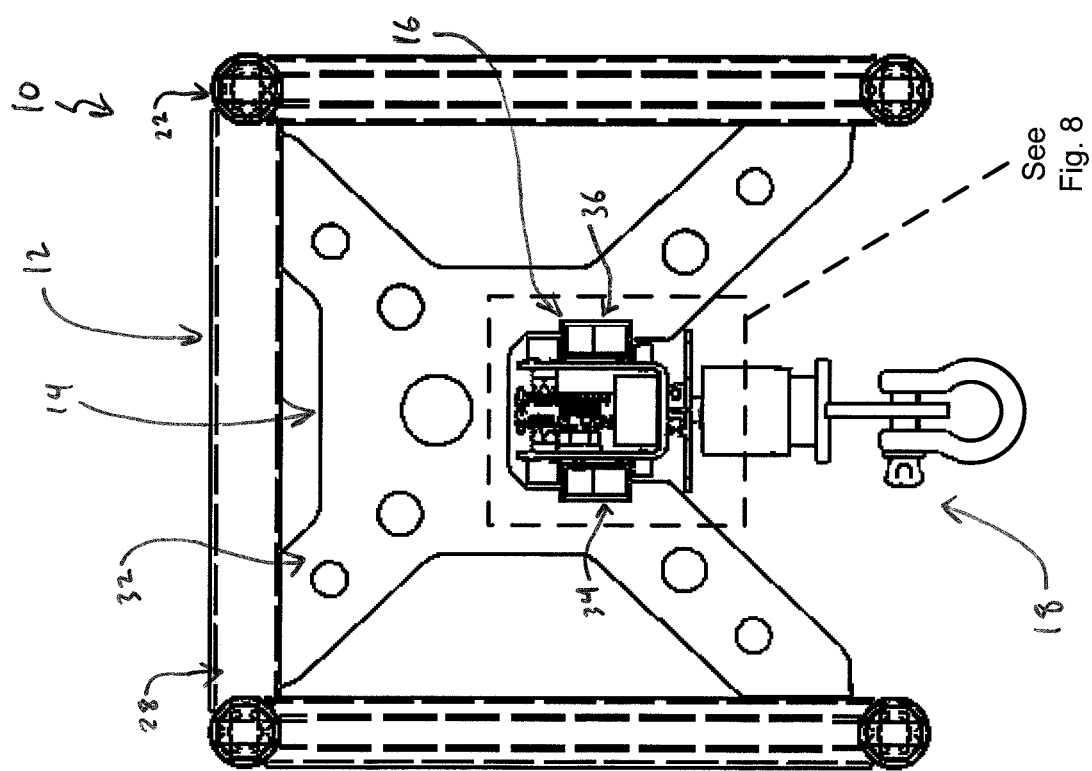
FIG. 7 is an end elevation view of the appliance support system of FIG. 1 showing the carriage extending between rails of the track and suggesting that braces supporting the rails are arranged to allow the carriage to move along the length of the truss on the track.

Track 16 includes a pair of rails 34, 36, and carriage 18 extends between and is supported by rails 34, 36 as shown in FIGS. 4-6. In the illustrative embodiment, rail 34 includes a plurality of set-point holes 31 arranged along rail 34. Twist lock 50 coupled to body 42 of carriage 18 is configured to engage with set-point holes 31 to block movement of carriage 18 relative to track 16 at the selection of a user. Rollers 47 of carriage 18 ride along an upper portion of track 16 and guides 48 extend along a lower portion of track 16 to block vertical movement of carriage 18 relative to track 16 as shown in FIGS. 6-8. Braces 32 are arranged to allow carriage 18 to move along track 16 between ends 24, 26 of truss 12. In some embodiments, tracks 16 of adjacent attached appliance-support systems 10 align with one another to allow carriage 18 to move from one appliance-support system to the other along tracks 16.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. An appliance-support system comprising:
   a truss having a plurality of spaced apart beams extending between a first end of the truss and a second end of the truss to define a length of the truss and a plurality of cross bars coupled between the plurality of beams; and
   a positioning system comprising:
      a track coupled to the truss and including a pair of spaced apart rails; and
      a carriage comprising a body engaged with the track and a spindle coupled to the body, the body positioned between the rails and including a frame and a plurality of rollers coupled to the frame, the rollers configured to engage with the rails and allow movement of the body along the track, guides coupled to the body being positioned to engage a lower side of the rails and the rollers being positioned to engage an upper side of the rails to block movement of the carriage relative to the track other than along the length of the truss,
   wherein the body is configured to support the carriage relative to the truss and allow for movement of the carriage along the length of the truss and the spindle is configured to support an appliance relative to the truss and allow movement of the appliance toward and away from the body at a selection of a user, and
   wherein the body is formed to define an interior and an exterior, the spindle includes a block coupled to the interior of the body, an adjustment bolt coupled to the block to extend from the interior of the body to the exterior, and a hanger coupled to the adjustment bolt exterior of the body, the adjustment bolt engages with the block to allow adjustment of the hanger toward and away from the body, the hanger includes a socket, a bearing coupled to the socket, a cap coupled to the socket over the bearing, and a support flange coupled to the cap and configured to support the appliance relative to the truss, and the adjustment bolt engages with the bearing to support the hanger relative to the body and to allow rotation of the hanger relative to the adjustment bolt.

2. The appliance-support system of claim 1, further comprising an adjustment knob coupled to the adjustment bolt for engagement by a user to move the adjustment bolt relative to the block.

3. The appliance-support system of claim 1, further comprising a lock mechanism coupled to the body, wherein the lock mechanism includes a lock pin and a grip coupled to the lock pin for engagement by a user to move the lock pin relative to the body, wherein at least one of the rails includes a plurality of set-point holes spaced apart along the rail, and wherein the lock pin is configured to engage with the body and the set-point holes to block movement of the carriage relative to the track.

4. The appliance-support system of claim 1, further comprising braces coupled between the truss and the track to space the rails apart from the beams and the cross bars.

5. A scaffolding comprising:
   a first appliance-support system coupled to a second appliance-support system, each of the first and second appliance support systems comprising:
      a truss having a plurality of spaced apart beams and a plurality of cross bars coupled between the plurality of beams; and
      a track coupled to the truss and including a pair of spaced apart rails; and
   a carriage comprising a body and a spindle coupled to the body, the body positioned between the rails and including a frame and a plurality of rollers coupled to the frame, the rollers configured to engage with the rails and allow movement of the body along the tracks, guides coupled to the body being positioned to engage a lower side of the rails and the rollers being positioned to engage an upper side of the rails to block movement of the carriage relative to the tracks other than along a length of the scaffolding,
   wherein the tracks of the first and second appliance-support systems align with one another, the body is configured for movement along the tracks from the first appliance-support system to the second appliance-support system, and the spindle is configured to support an appliance relative to the body and allow movement of the appliance toward and away from the body at a selection of a user, and
   wherein the body is formed to define an interior and an exterior, the spindle includes a block coupled to the interior of the body, an adjustment bolt coupled to the block to extend from the interior of the body to the exterior, and a hanger coupled to the adjustment bolt exterior of the body, the adjustment bolt engages with the block to allow adjustment of the hanger toward and away from the body, the hanger includes a socket, a bearing coupled to the socket, a cap coupled to the socket over the bearing, and a support flange coupled to the cap and configured to support the appliance relative to the truss, and the adjustment bolt engages with the bearing to support the hanger relative to the body and to allow rotation of the hanger relative to the adjustment bolt.

6. The scaffolding of claim 5, further comprising an adjustment knob coupled to the adjustment bolt for engagement by a user to move the adjustment bolt relative to the block.

7. The scaffolding of claim 5, further comprising a lock mechanism coupled to the body, wherein the lock mechanism includes a lock pin and a grip coupled to the lock pin for engagement by a user to move the lock pin relative to the body, wherein at least one of the rails includes a plurality of set-point holes spaced apart along the rail, and wherein the lock pin is configured to engage with the body and the set-point holes to block movement of the carriage relative to the tracks.

8. The scaffolding of claim 5, wherein each of the first and second appliance-support systems further comprises braces coupled between the truss and the track to space the rails apart from the beams and the cross bars.

* * * * *